United States Patent

Foschini

[11] Patent Number: 6,097,771
[45] Date of Patent: Aug. 1, 2000

[54] WIRELESS COMMUNICATIONS SYSTEM HAVING A LAYERED SPACE-TIME ARCHITECTURE EMPLOYING MULTI-ELEMENT ANTENNAS

[75] Inventor: Gerard Joseph Foschini, South Amboy, N.J.

[73] Assignee: Lucent Technologies Inc., Murray Hill, N.J.

[21] Appl. No.: 08/673,981

[22] Filed: Jul. 1, 1996

[51] Int. Cl.[7] .............................. H03D 1/04; H03D 1/06; H03K 5/01; H03K 6/04
[52] U.S. Cl. ............................... 375/346; 375/349
[58] Field of Search .................... 375/260, 347, 375/349, 267, 346, 348, 285, 259; 343/751, 893; 370/334; 379/410, 411

[56] References Cited

U.S. PATENT DOCUMENTS

| | | |
|---|---|---|
| 3,619,510 | 11/1971 | Zegers . |
| 3,629,509 | 12/1971 | Glaser . |
| 3,670,337 | 6/1972 | Earp et al. . |
| 4,292,639 | 9/1981 | Bambara . |
| 4,353,119 | 10/1982 | Daniel et al. . |
| 4,434,423 | 2/1984 | Kautz . |
| 4,513,383 | 4/1985 | Hackett, Jr. .............................. 364/517 |
| 4,931,977 | 6/1990 | Klemes .................................... 364/581 |
| 4,947,176 | 8/1990 | Inatsume et al. ........................ 342/173 |
| 5,175,558 | 12/1992 | DuPree ..................................... 342/378 |
| 5,434,578 | 7/1995 | Stehlik ..................................... 342/383 |
| 5,548,834 | 8/1996 | Suard et al. .......................... 455/276.1 |
| 5,581,260 | 12/1996 | Newman ................................. 342/374 |
| 5,649,287 | 7/1997 | Foressen et al. ........................ 370/312 |
| 5,828,658 | 10/1998 | Ottersten et al. ........................ 370/310 |

*Primary Examiner*—Jason Chan
*Assistant Examiner*—Jean B Corrielus

[57] ABSTRACT

The Shannon limit governs the ultimate bit rate at which a digital wireless communications system may communicate data. A digital wireless receiver may be enhanced such that it approaches the Shannon limit by decomposing a n-dimensional system into n-one dimensional systems of equal capacity.

10 Claims, 5 Drawing Sheets

FIG. 7

WIRELESS COMMUNICATIONS SYSTEM HAVING A LAYERED SPACE-TIME ARCHITECTURE EMPLOYING MULTI-ELEMENT ANTENNAS

TECHNICAL FIELD

The invention relates to wireless communications systems.

BACKGROUND OF THE INVENTION

The ultimate bit rate at which a digital wireless communications system may communicate data may be derived using Shannon's well-known approach to information theory (commonly referred to as the Shannon limit). The ultimate bit rate is based on a number of different parameters including (a) total radiated power at the transmitter, (b) the number of antenna elements at each site, bandwidth, (c) noise power at the receiver, (d) characteristics of the propagation environment, etc. For wireless transmission in a so-called Rayleigh fading environment, the ultimate bit rate could be enormous, e.g., hundreds of bits per second per Hz for a system employing 30 antennas at both the transmitter and receiver and experiencing an average signal-to-noise ratio of 24 dB. Heretofore, systems that were built with the aim of achieving high bit rates did not come close to Shannon's ultimate bit rate. The bits rate associated with such systems was, at most, one or two orders of magnitude below the Shannon limit. The main reason for this is that prior art developers did not appreciate the problems that had to be solved in order to build a system that communicates at a rate that approached an appreciable fraction of the Shannon limit.

SUMMARY OF THE INVENTION

The relevant art of wireless transmission and reception is advanced as a result of recognizing the problems that need to be solved in order to build a system that approaches the ultimate Shannon bit rate. This is achieved, in accordance with an aspect of the invention, by decomposing a n-dimensional system into n-one dimensional systems of equal capacity when the transfer (H matrix) characteristics of the wireless channel are unknown to the transmitter. More specifically and in accordance with the principles of the invention, signal components received during respective periods of time over a plurality of antennas associated with a wireless receiver are formed into respective space and time relationships in which space is associated with respective transmitter antenna elements are preprocessed, in turn, such that a collection of signal components having the same space/time relationship form a signal vector so that particular decoded signal contributions may be subtracted from the signal vector while particular undecoded contributions may be nulled out of the signal vector. The resulting vector is then supplied to a decoded for decoding to form a primitive data stream.

These and other aspects of the invention are described and shown in the ensuing detailed detailed description and drawings.

DETAILED DESCRIPTION

The following illustrative embodiment of the invention is described in the context of a point-to-point communication architecture employing an equal number of antenna array elements at both the transmitter and receiver. Moreover, as will be seen below, the capacity (or bandwidth) that may be achieved using the inventive architecture is indeed enormous. In fact, it might seem to be too large (in terms of the number of bits/cycle) to be meaningful. However, the capacity that may be obtained is in terms of n equal lower component capacities, one for each of the antennas at the receiver (or transmitter). At a lower bound, the capacity of the inventive architecture equals that achieved using multi-element arrays having an equal number of antenna elements at both ends of the link, i.e., transmitter and receiver.

For the sake of clarity in describing the inventive architecture, the following defines the various notations and assumptions that will be referred to in the description from the perspective of a complex baseband in which the transmission environment is over a fixed linear matrix channel with additive white gaussian noise (AWGN). In that case then, time is defined to proceed in discrete steps normalized so that t=0, 1, 2 . . .

Specifically, $n_t$ and $n_r$ refer to the number of antenna elements in the Multi-Element Array (MEA) at the transmitter and receiver, respectively. The transmitted signal is noted as $s_t$, in which, for a fixed narrow bandwidth, the total power may be constrained regardless of the value of $n_t$. The levels of noise at the receiver is noted by the $n_R$ dimensional vector, v(t), the components of which are statistically independent. They may also have identical power levels N. The received signal is noted as r(t) such that for a received signal of $n_R$ dimensions, there is one complex vector component for each receiver antenna at each point in time. For one transmit antenna transmitting at a power level of $\hat{P}$, the average power level outputted by a receiver antenna is noted as P, where average means spatial average. The average signal to noise (SNR) is noted as $\rho$ which is equal to P/N independent of $n_t$. The so-called channel impulse response matrix is noted as g(t), in which the matrix has $n_T$ and $n_R$ rows. The normalized form of g(t) is noted as h(t), in which the normalization of each element of h(t) has a spatial average of unity "power loss". Also, the basic vector describing the channel operating on a signal is defined as follows:

$$r = g*s + v \qquad (1)$$

where * means convolution. The three vectors, g, s and v, are complex $n_R$ dimensional vectors (i.e., 2 $n_R$ real dimensions). Since the bandwidth is assumed to be narrow, the channel Fourier transform G may be defined as a matrix constant over the bandwidth that is of interest. For that case, then, the nonzero value of the channel impulse response may be noted as g, which suppresses the time dependence of g(t). The time dependence may be similarly depressed for h and its Fourier transform H. Thus, equation (1) may be expressed in normalized form as follows:

$$r = \sqrt{\rho/n_T} \times h \times s + v \qquad (2)$$

Also assume that a channel is modeled as, e.g., a Rayleigh channel, and that the MEA elements at each end of the communication link are separated by about one-half of a wavelength. For example, at 5 GHz, one-half of a wavelength is only about 3 cm. Advantageously, then, the transmitter and receiver may be configured to each have a large number of antenna elements. (Note, as an aside, each "antenna" may have two states of polarization.) For a separation of one-half wavelength, the Rayleigh model for the $n_R \times n_T$ matrix H representing the channel in the frequency domain is a matrix having independent, identically distributed (i.i.d.), complex, zero mean, unit variance entries as shown by the following expression:

$$H_{ij} = \text{Normal}(0, 1/\sqrt{2}) + \sqrt{-1} \times \text{Normal}(0, 1/\sqrt{2}) \qquad (3)$$

where $|H_{ij}|^2$ is a $\chi^2$ variate with two degrees of freedom, denoted as $\chi^2_2$, but normalized so that $E |H_{ij}|^2 = 1$.

With the foregoing in place, the capacity of the inventive architecture may now be defined starting with a so-called long burst perspective, where "long burst" means a burst comprising a very large number of symbols. The duration of the burst is assumed to be sufficiently short such that the channel is essentially unchanged during a burst.

It is also assumed that the characteristics of the channel are unknown to the transmitter but may be learned (tracked) by the receiver. Also, such characteristics can change considerably from one burst to the next. The term "unknown" is taken to mean herein that the realization of H during a burst is unknown, but the transmitter is assumed to know the value $n_R$. Although, in practice, the transmitter may not know the average SNR value, it is, nonetheless, assumed herein that the value of $\rho$ is known. It is further assumed that at least is a particular average SNR is available whenever the transmitter is communicating with a user, in which the known value of $\rho$ may be considered to be the minimum value for that SNR.

As is known in the prior art, a transmitter may use a single code even though the specific value of the H matrix is unknown. Given that, then the system capacity may be considered to be a random variable whose distribution is derived from an ensemble of statistically independent gaussian $n_R \times n_T$ H matrices (i.e., the aforementioned Rayleigh model). For each realization of H, the system is OUT— meaning that a specified system capacity, X, cannot be met—or NOT OUT—meaning that the system capacity can be met. Moreover, when specifying bit rate, the level of the so-called outage (i.e., where the random H does not support the bit rate) also has to be considered. Typically, the value of an outage needs to be kept small, e.g., 1%–5% to assure that the desired bit rate can be met. The value of an outage (probability) can be improved significantly using MEAs, as will be shown below.

As is also known in the art, system capacity for the generalized case of ($n_T$, $n_R$) may be expressed as follows:

$$C = \log_2 \det[I_{nR} + (\rho/n_T) \times HH^*]\text{bps/Hz} \qquad (4)$$

where det means determinate, $I_{nR}$ is the ($n_T \times nR$) identity matrix and & means transpose conjugate.

In view of the above, then a lower bound for the desired system capacity for the case (n, n) (i.e., $n_T = n_R = n$) may be expressed as follows:

$$C > \sum_{k=1}^{n} \log_2[1 + (\rho/n) \times \chi^2_{2k}]\text{bps}/Hz \qquad (5)$$

The right-hand side of equation 5 uses nonstandard notation, for example, the term $\chi^2_{2k}$ is used to denote a chi-squared variate having 2k degrees of freedom. Since the entries of H are complex gaussians with zero mean and unit variance, the mean of this variate is k. As will be shown below, for large values of $\rho$ and n the bound is attained in a certain asymptotic sense. As will also be shown below, the capacity of the inventive communications system achieves this lower bound.

An illustrative embodiment of invention will now be discussed in the context of a system having six antennas at a transmitter and an equal number of antennas at the receiver. However, it is to be understood that this number is not be construed as a limitation since the claimed invention may be implemented with a larger (or arbitrary) number of antennas at the transmitter and receiver as will be appreciated from the following description.

Figure 1:
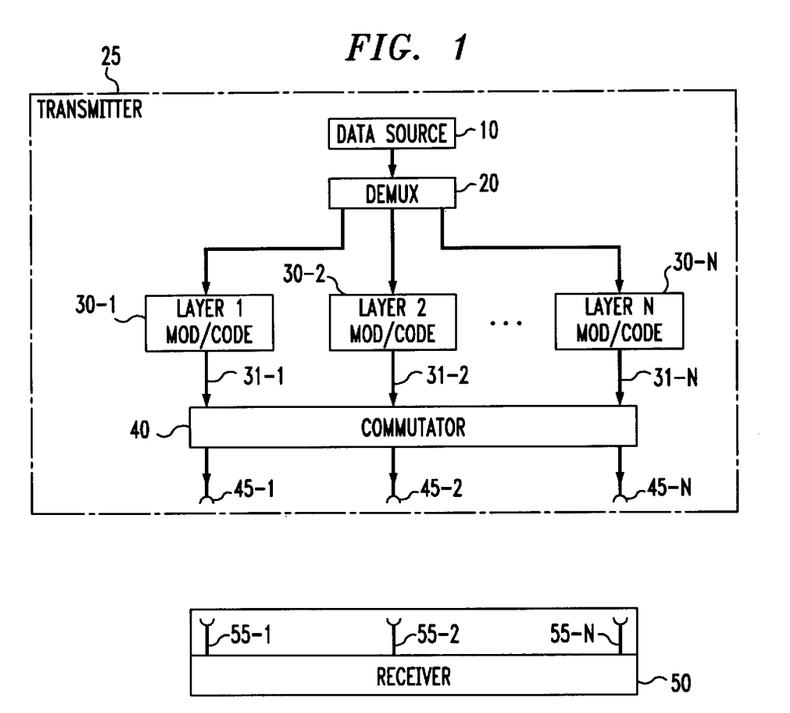
FIG. 1 illustrates in block diagram form a wireless transmitter and receiver embodying the principles of the invention.

In a general case, a transmitter in a wireless communications system that is implemented in accord with the principles of my invention, such as the transmitter of FIG. 1, may include n antennas. Specifically, demultiplexer 20 demultiplexes a primitive data stream received from a source of data 10 into n data streams of equal rate supplied to respective modulators/coders 30-1 through 30-N which may independently encode and then modulate their respective data streams. For example, a first data stream is supplied to the layer 1 modulator/encoder 30-1, a second data stream is supplied to the layer 2 modulator/encoder 30-2 and so on. Each such stream may be encoded in anyone of different ways at the respective coder 30. Such encoding is not pertinent to the claimed invention and, therefore, will not be discussed herein. However, for the sake of completeness a data stream may be encoded using, for example, a block code. Once the data in a respective stream is encoded and modulated it is then supplied to commutater 40.

Commutator 40, more particularly, cycles segments of the modulated encoded stream of data that is being received from a particular one of the coders 30i to each of n antennas 45-1 through 45-n, in turn, for transmission to receiver 50. That is, a modulator/encoder 30i, e.g., 30-1, is associated, in turn, with each of the antennas 45i. Thus, the association between a bit stream (i.e., modulator/encoder 30i) and an antenna 45-i is periodically cycled. The length in time of such association is τ seconds so that a full cycle takes n times τ seconds. In this way, the output from a modulator/encoder 30-1, e.g., the data stream supplied via path 31-1, is transmitted first using antenna 40-1 during the first τ seconds, the data stream supplied via path 31-1 during the second τ seconds is then transmitted using antenna 40-2, and so on. The n coded bit streams thus share a balanced presence over all n transmission paths to receiver 50 and therefore none of the individual bit streams are contiguously subjected to the worst of the n paths. The encoded transmissions are then received by each of the antennas 55-1 through 55-n and supplied to receiver 50 for further processing.

Figure 2:
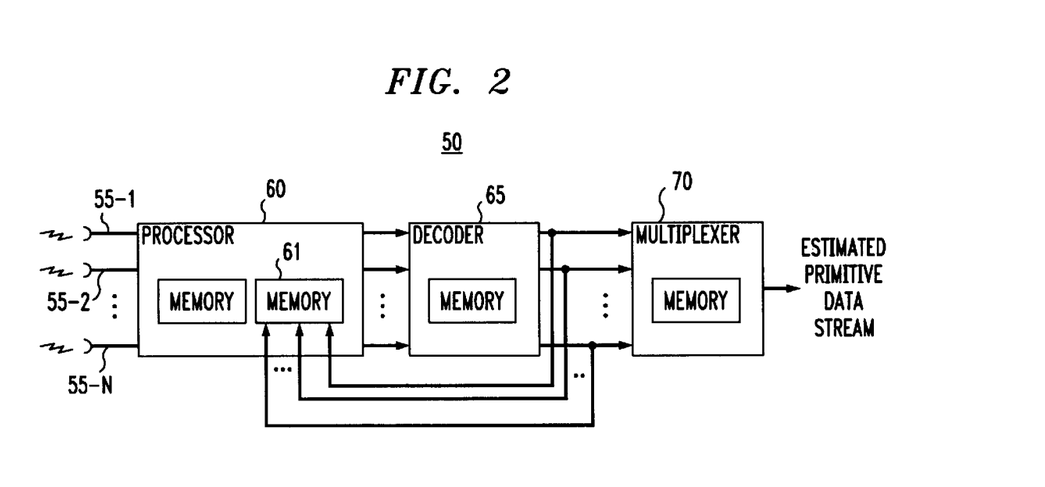
FIG. 2 illustrates in a more detailed block diagram the wireless receiver of FIG. 1.

Receiver 50, FIG. 2, includes, inter alia, a bank of conventional RF receiver sections (not shown) which interface with antennas 55*i*, respectively. It also includes preprocessor 60, decoder 65 and multiplexer 70. Preprocessor 60 receives the signals as respective signal vectors from the n antennas 55-i, and preprocesses the received signal vectors to eliminate interference between the signal components forming the vectors using (a) nulling and (b) subtraction of previously detected symbols, as will be discussed below in detail. A received vector has n complex components respectively received by antennas 55-1 through 55-n. Decoder 65 further processes the preprocessed signal vectors to detect the n constituent data substreams and thus the symbols representing the coded substreams. Decoder 65 then supplies the symbols to preprocessor 60 for storage in memory 61 so that interference from signals already detected may be subtracted from the received signal vector. Multiplexer 70 then multiplexes the substreams to form the original data stream outputted by source 10.

More specifically, assume that both transmitter 25 and receiver 50 has six antennas 45-1 through 45-6 and 55-1 through 55-6, respectively. Also assume that a training phase which allows receiver 50 to determine the propagation characteristics associated with each transmitter has already been completed. These propagation characteristics are represented by an n×n complex matrix H, as will described below in detail. During this training (start-up) phase known signals are transmitted out of each of the antennas 45-1 through 45-6 and processed at the receiver to provide accurate estimates for the entries in the H matrix at the receiver. (Note that the transmitter need not know/determine such channel characteristics.)

Figure 3:
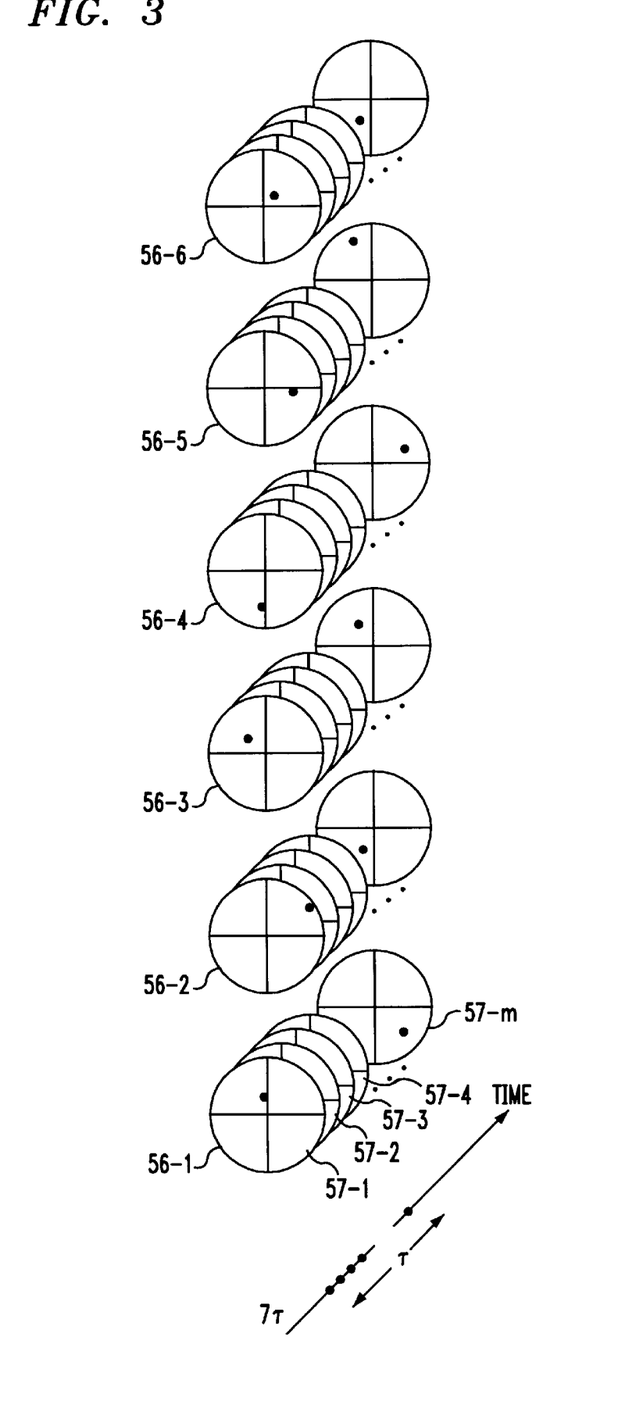
FIG. 3 illustrates a time-space relationship among a number of n-dimensional complex signal vectors that may be received at the receiver of FIG. 1 during a respective interval of time.

As mentioned above, a received vector has n complex components respectively received by antennas 55-1 through 55-n. That is, a receive antenna, antenna 55-1, receives a combination of all n transmitted signals plus additive noise. Antenna 55-2, on the other hand, receives a different combination of all n transmitted signals (plus additive noise), and so on. FIG. 3 illustrates a number of n-dimensional complex signal vectors received during a respective interval of $\tau$ seconds in space and time. Specifically, each dot in each of the vertical segments 56-1 through 56-6 (circles) represents a component of a complex signal vector for a respective segment of time during an interval of $\tau$ seconds. Thus, a different vector composed of six such components are received by antennas 55-1 through 55-6 for each of the segments 57-1 through 57-m, where m≦1.

Figure 4:
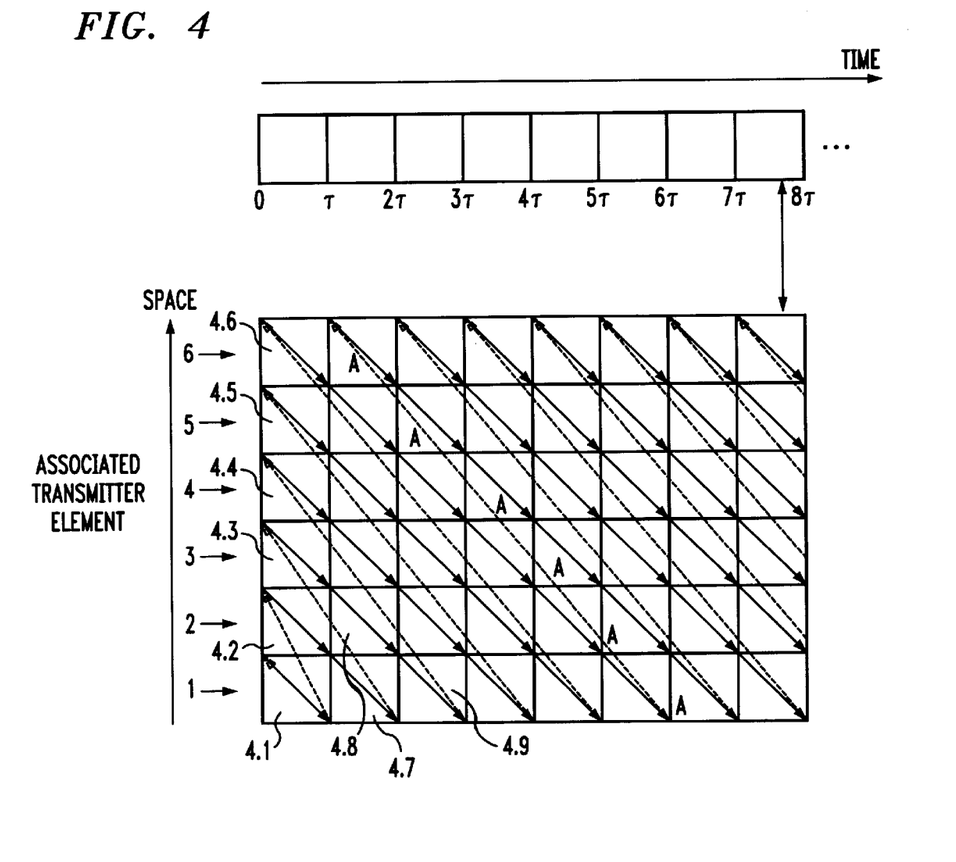
FIGS. 4 and 5 illustrate the order in which a succession of received signal vectors are preprocessed.

The time sequence that is used to preprocess a succession of vectors received during a series of $\tau$ intervals is illustrated in FIG. 4. In particular, a sequence of eight $\tau$ intervals (shown as rectangles) is illustrated at the top of FIG. 4. Each of the rectangles in the sequence represents all of the six-dimensional complex vectors (e.g., FIG. 3) received during a respective one of such intervals.

The composite of signals (vectors) received during a particular $\tau$ interval is then replicated six times to form a column of rectangles, as shown in FIG. 4. For example, the six-dimensional complex vectors received during the first $\tau$ interval are replicated six times (forming rectangles 4.1 through 4.6) and respectively associated with transmit antennas 45-1 through 45-6 (respectively designated 1 through 6 in the FIG). (It is noted that the stack of rectangles illustrated in FIG. 4 is used herein solely for the purpose of describing the preprocessing of the received signals and should not be construed as being a limitation of the claimed invention.) Continuing, a spatial element, namely a transmitter antenna, is associated with each rectangle in this "wall" of rectangles as depicted in FIG. 4 by the designations 1 through 6 along the "space" ordinate. The partitioning of the rectangles results in a partitioning of "space-time". It is also noted that each interval of time $\tau$ may span any number of time units and, as already mentioned, each space element is associated with a respective transmitter element 45*i*.

The solid arrows shown in FIG. 4 show the order in which a succession of received vectors are preprocessed and the dotted arrows show the sequence of such preprocessing starting with the rectangle in the lower, left-hand corner, namely rectangle 4.1 Such preprocessing then proceeds upward to block 4.2 and then diagonally downward to rectangle/block 4.7. When the vectors associated with the latter rectangle have been preprocessed, then the process moves upward in the manner shown to preprocess the next sequence of blocks starting with block 4.3 and then diagonally downward through blocks 4.8 and 4.9. The process then, in turn, moves upward along a succession of consecutive space-time layers (diagonals) and moves left to right as indicated in the FIG. 4 with the thin directed "arrow" (which is really an ordered sequence of directed lines).

The aim of preprocessing vectors associated with a rectangle is to avoid interference that occurs as a result of the signal components interfering with one another. Such interference is eliminated from a block of signal vectors by either nulling or subtracting out the interference. As noted below, less interference is nulled out at the higher levels/rectangles in the diagonal layer since most of the interference is subtracted out as a result of the preprocessing that occurs for those rectangles. As will be discussed below, instead of nulling, the Signal to Noise Ratio (SNR) could be maximized, in which the term "noise" may include not only Additive White Gaussian Noise (AWGN) but also all interferences that are not yet subtracted out. (Hereinafter, $\rho$ will be taken to mean the SNR representing the spatial average of anyone of the receiver antennas. Also, it is to be understood that the radiated power summed over all of the transmit antennas is held constant independent of the number of such transmit antennas.)

Figure 5:
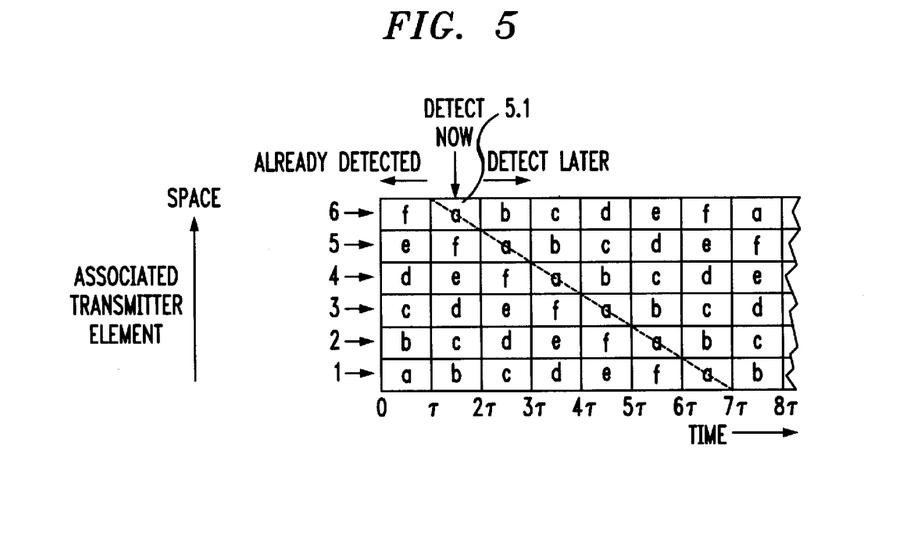

Continuing, the preprocessing of the signals is illustrated in more detail in FIG. 5, in which the preprocessing steps proceed in the manner discussed above along related diagonal layers, one of which is depicted by the dotted line. In the FIG., each of the letters a, b, c, d, e and f corresponds to a respective substream of encoded information and is associated with a respective transmitter antenna element and time interval, as mentioned above. For the sake of clarity and simplicity, the following discussion is directed to the first complete diagonal "a" layer identified by the dashed diagonal line. It is noted that other layers, including boundary layers, i.e., those layers where an entire burst of encoded data starts or ends and encompasses less than six rectangles, are handled similarly. For example, the two rectangles/blocks designated "b" and occurring during the first two time intervals and associated with transmit antennas 45-1 and 45-2, respectively, are preprocessed in a similar manner as the diagonal of "a" rectangles/blocks.

(It is noted that the layers to the left of and below the "a" layer (the dotted line shown in FIG. 5) may constitute a part of a training session which the receiver uses to determine particular characteristics associated with a particular channel. These characteristics include, the elements of the aforementioned H matrix and may also include, for example, (a) carrier frequency, (b) optimum sampling time, (c) the duration between symbols received consecutively, etc.)

Specifically, it is seen from FIG. 5 that the first complete "a" layer spans six intervals of time each of duration $\tau$, which may be expressed as $a_{j\tau}(t)$, where (j=1, 2, . . . 6) and where the total subscript indicates when the time interval begins. It is assumed that the encoded symbols respectively associated with the diagonal layers beneath the diagonal "a" layer have been successfully detected by the preprocessing and decoding procedures. Whereas the symbols associated with the layers disposed above the "a" layer and which affect the preprocessing of the "a" layer are yet to be detected. Since these symbols are not yet detected, and therefore cannot be subtracted out their affect (interference) on the "a" layer will then be nulled out. Note that the interference that needs to be nulled out will be different for each of the six time intervals associated with the "a" layer. The reason for this is simply that there are different number of undetected layers of rectangles in each $\tau$ interval.

Since the five layers below the "a" layer residing in the time interval spanning from $\tau$ to $2\tau$ only have already been detected, and all interference from the signal components transmitted from antennas labeled 1 to 5 have been subtracted out, there is no interference. Consequently, for the first "a" interval there is effectively a six-fold receive diversity, i.e., where six noisy interference free signal components are optimally linearly combined for further processing. During the next interval from $2\tau$ to $3\tau$ there is only one "interferer" that needs to be nulled out of the "a" layer signal that is associated with transmitter antenna 45-5, namely the above "b" layer signal associated with transmitter antenna 45-6. The contributions associated with the other four transmitter antennas (45-1 through 45-4) have been subtracted out. The process of nulling out one "interferer" reduces the number of dimensions characterizing the received vector signal by one. Similarly, nulling out two such interferers reduces the number of dimensions characterizing the received vector signal by two and so on. This process is repeated for the segments of block "a" layer associated with the remaining time intervals through $6\tau$. For the next interval ($6\tau$ to $7\tau$), all five of the signals associated with transmitter antennas 45-2 through 45-6 interfere and therefore must be nulled out of the "a" layer signal associated with transmitter antenna 45-1. The result obtained from preprocessing the "a" layer is supplied to decoder 65, which generates the received symbols and, hence, the data represented by those symbols. Following the foregoing, receiver 50 then preprocesses the next (succeeding) layer of rectangles ("b" layer) and so on in a is similar manner supplying the result to multiplexer 70 (FIG. 2) which then reconstructs the primitive data stream from the detected substreams.

Figure 6:
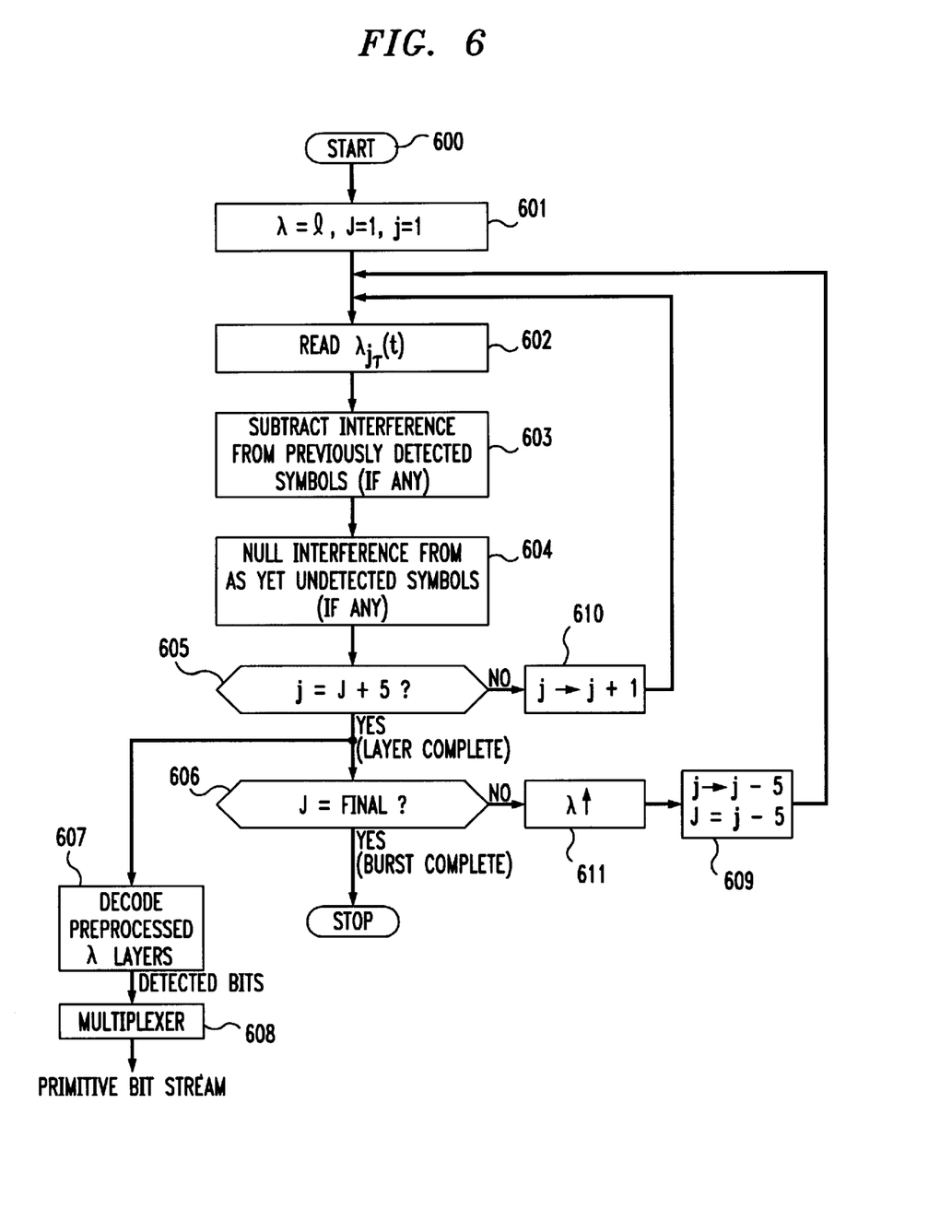
FIG. 6 illustrates in flow chart form the program which implements the principles of the invention in the system of FIG. 1.

The foregoing process is illustrated in flow chart form in FIG. 6. Specifically, upon being entered at block 600 responsive to receiving transmitted signals from transmitter 100 the process proceeds to block 601 where it initializes the values associated with three variables, $\lambda$, J and j. The variable $\lambda$ is used to index the aforementioned layers, J is used to index the layer start address and j is used to index a start time of a rectangle/block within a particular layer. The process then proceeds to step 602 where it unloads from memory the received vectors corresponding to a rectangle indexed by the values of j and $\tau$, where $\tau$ is the duration in time of a rectangle as discussed above. The process then proceeds to step 603 where it subtracts the interference from previous detected symbols (if any) from the vectors it has unloaded from memory in the manner discussed above. The process (step 604) then nulls out the interference imposed by any symbols that have been received but have not yet been detected (i.e., undecoded symbols). (It is noted that, as discussed above, a maximum signal to noise ratio type of approach may be used in place of nulling. It is also noted that the order of steps 603 and 604 may be reversed.)

Following the foregoing, the process (605) determines if the processing of the current layer has been completed. For example, if a layer is composed of six rectangles, then the process checks the value of j to see if the processing of six rectangles has been completed, i.e., j equals J+5. If not, then the process (step 610) increments the value of j to process the next rectangle and returns to step 602. If so, then the process initiates the decoding of the preprocessed signals within the current layer. In addition, the process checks (step 606) to see if has completed the preprocessing of all layers that need to be preprocessed. That is, the process compares the value of J with a variable "Final" which marks the start time of the last layer that need to be preprocessed. If not, the process (step 611) increments $\tau$ to point to the next layer of rectangles that need to be preprocessed. The process then (step 609) sets the value of J to point to the start time of first rectangle (e.g., "a" rectangle 5.1, FIG. 5) in that layer. The process also sets the value of j to cycle through the rectangles forming the layer identified by the new value of J. The process then returns to step 602 to start the preprocessing of the first rectangle in that layer.

The process represented by step 607 decodes the contents of the preprocessed layer that is received from the preprocessing stage and stores the decoded symbols in memory for use by the preprocessing function (step 603). The decoded results are also presented to a multiplexing process (step 608) which uses the decoded bits from a number of decoded layers to form the aforementioned primitive bit stream (note that step 607 may run in parallel with the preprocessing function). It is noted that if the comparison performed at step 606 is true—meaning that the preprocessing of the final (last) layer has been completed—then the preprocessing is stopped until receipt of the next stream of signals from transmitter 100.

Although the layered architecture described above may seem to be fragile, it is, nevertheless, quite robust. That is, the successful detection of each layer relies on the successful detection of the underlying layers and any failure in any layer but the last will very likely cause the detection of all subsequent layers to fail. However, the following quantitative discussion illustrates that fragility is generally not a significant problem, especially when huge capacity is available.

I have recognized that since the claimed invention achieves a huge capacity, as discussed above and as will be appreciated form FIG. 7, a portion of this capacity may be used to guarantee a very low probability of an error occurring in a system employing a burst data communications mode. Thus, the fragility of the claimed invention is not an issue. In particular, let ERROR denote the event that a packet (=long burst) contains at least one error for whatever reason. If an ERROR event does occur, it is decomposed into two disjoint events ERROR=$\text{ERROR}_{nonsupp} \cup \text{ERROR}_{supp}$. The term $\text{ERROR}_{nonsupp}$ means that channel realization simply does not support the required Bit Error Rate (BER) even if a so-called "genie" were available to enhance the receiver processing by removing interference from all underlying layers perfectly. The term $\text{ERROR}_{supp}$ means the remaining ERROR events. If the desired system outage is 1% and the packet size (payload) is 10,000 bits, then the BER cannot exceed $10^{-7}$. However, a lower BER may be achieved by using some of the huge transmission capacity that is obtained by the instant invention (i.e., extra capacity), e.g., a BER that is at least one order of magnitude lower. Since $10^4$ times $10^{-8}=10\ \text{sup}^{-4}$ then about one packet in $10^4$ packets contains an error. This number of bit errors may be inflated by calling all bits in such a packet in error. However, such an exaggeration is harmless since associating those packets with errors to an outage results in an insignificant probability compared to the probability of ERROR$_{nonsupp}$ occurring. Moreover, such huge capacity provides the luxury of concluding that when an error does occur the system may be considered to be an outage. Conversely, when an outage does not occur, then the system is providing error free transmission.

The fact that the channel capacities achieved by the claimed invention using one dimensional coding/decoding of n-dimensional signals comes very close to the aforementioned Shannon capacities will now be demonstrated using linear algebra and probability theory. Specifically, let $H_j$ with $1 \leq j \leq n$ denote the n columns of the H matrix ordered left to right so that $H=(H_{.1}, H_{.2}, \ldots H_{.n})$. For each k, such that $1 \leq k \leq n+1$, $H_{[k,n]}$ denote the vector space spanned by the column vectors $H_j$ satisfying $k \leq j \leq n$. Since there are no such column vectors when $k=n+1$ the space $H_{[n+1,n]}$ is simply the null space. Note that the joint density of the entries of H is a spherical symmetric (complex) $n^2$-dimensional gaussian. For that case then, and with probability one, $H_{[k,n]}$ is of dimension $n-k+1$. Furthermore, with probability one, the space of vectors perpendicular to $H_{[k,n]}$, denoted $H^\perp_{[k,n]}$ is $k-1$ dimensional. For $j=1,2, \ldots n$ we define $\eta_j$ as the projection of $H_j$ into the subspace $H^\perp_{[j+1, n]}$. As we next explain, with probability one each $\eta_j$ is essentially a complex j-dimensional vector with iid N(0, 1) components ($\eta_n$ is just $H_{.n}$). Strictly speaking an $\eta_j$ n-dimensional, but $\eta_j$ in an orthonormal basis the first basis vectors being those which span $H^\perp_{[j+1, n]}$ and the remaining those spanning $H_{[j+1, n]}$. Thus, the first j components of $\eta_j$ are iid complex gaussians while the remaining components are all zero. Placing such projections in the order $\eta_n, \eta_{n-1} \ldots \eta_1$, then it is evident that the totality of the $n \times (n+1)/2$ nonzero components are all iid standard complex gaussians. Consequently, the ordered sequence of squared lengths are statistically independent chi-squared variates with 2n, 2(n-1), ... 2 degrees of freedom respectively. With our choice of normalization the mean of the squared length of $\eta_j$ is j.

With reference to FIG. 5, it is noted that on each of the six time intervals for the "a" layer a different number of interferers have to be nulled out. For each of the six intervals we express, in turn, the capacity of a corresponding hypothetical system as if the additive interference situation held for all time. Corresponding to the first time interval, since the five layers below have already been detected, and all interference from the signal components transmitted from antennas labeled 1 to 5 subtracted out, there are no interferers. Consequently, there is effectively a six-fold receive diversity for the first time interval. If the interference was always nonexistent, then the capacity would be $C=\log_2[1+(\rho/6) \times \chi_{12}^2]$ bps/Hz. During the next interval there is one interferer since the other four, i.e., the signals from the transmit antennas labeled 1 through 4, have been subtracted out. For a system in which that level of interference prevailed, the capacity would be $C=\log_2[1+(\rho/6) \times \chi_{10}^2]$ bps/Hz.

The process of nulling out interference causes a reduction in the chi-squared subscript (giving $\chi_{10}^2$ in place of $\chi_{12}^2$). This process is repeated until finally the sixth interval is reached. Here all five of the signals from the other antennas interfere and therefore must be nulled out in order to obtain a corresponding capacity of $C=\log_2[1+(\rho/6) \times \chi_2^2]$ bps/Hz. Since the signals radiated by the six transmitting elements each multiply a different $H_j$, the six $\chi^2$ variates are statistically independent of each other for the reason mentioned above. For a system cycling among these six conditions with an equal amount of time $\tau$ spent on each, then the capacity would be $$C = 1/6 \sum_{k=1}^{6} \log_2[1 + (\rho/6) \times \chi_{2k}^2] bps/Hz.$$

If, for example, there are six such systems running in parallel each having the same realization of $\chi_{2k}^2$ (k=1,2 . . . 6) occurring in system, then, the capacity would be six times that given by the previous six-fold sum or $$C = \sum_{k=1}^{6} \log_2[1 + (\rho/6) \times \chi_{2k}^2] bps/Hz.$$

In the limit of a large number of symbols in a layer, since every sixth layer is an "a" layer (as is shown in FIG. 5). The above equation thus gives the capacity of the layered architecture for a system having six transmit antenna elements and six receive antenna elements (6, 6). Clearly, then, in the limit of a large number of symbols, the capacity for an (n, n) system is given by:

$$C = \sum_{k=1}^{n} \log_2[1 + (\rho/n) \times \chi_{2k}^2] bps/Hz.$$

Figure 7:
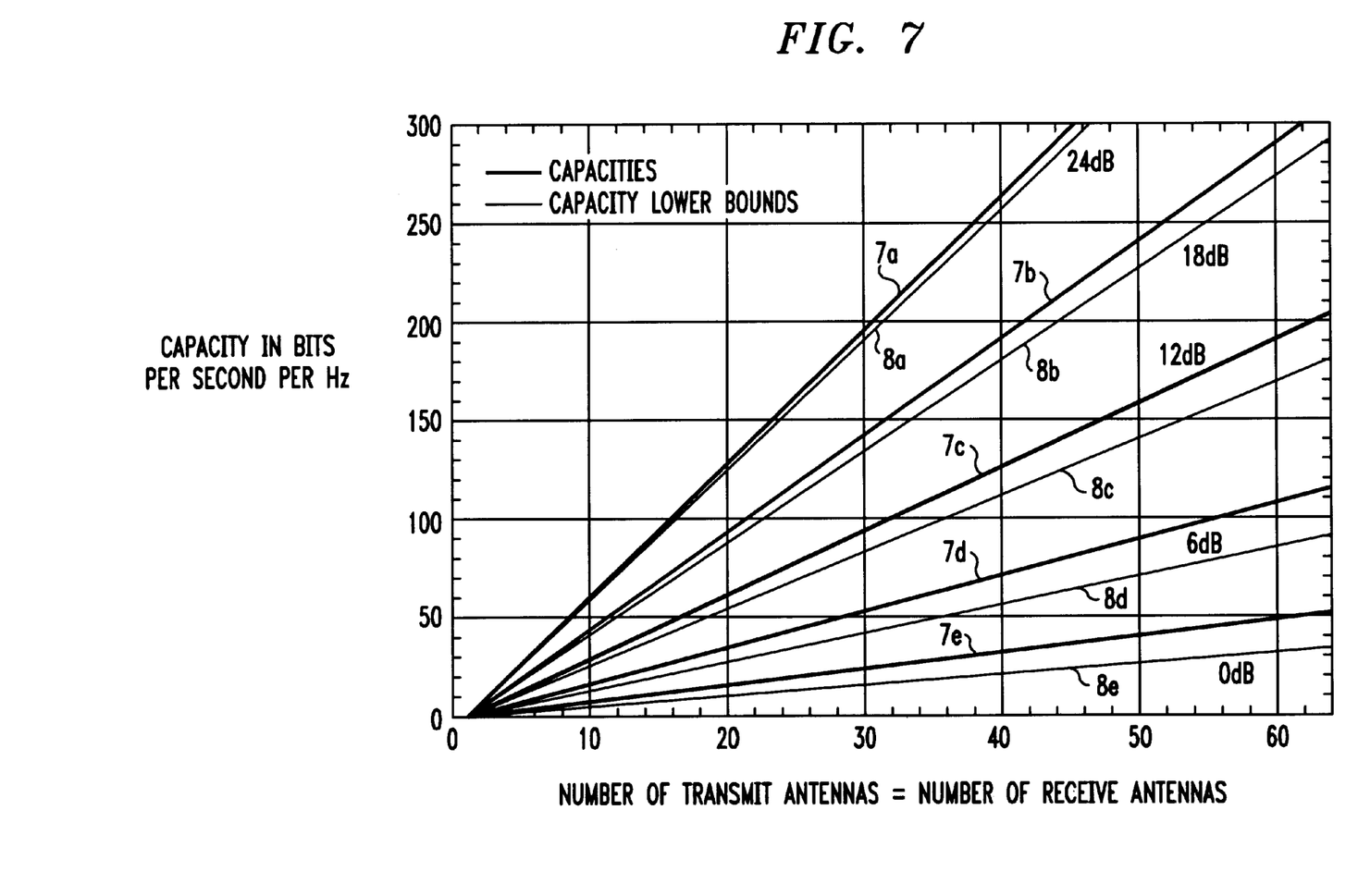
FIG. 7 graphically compares various capacities in bits per second per Hz that may be achieved in accordance with the principles of the invention with their corresponding Shannon limits.

The result of the foregoing derivations is embodied in FIG. 7 which illustrates system capacity versus the number of antenna elements at each cite. In the FIG. 7 the bold lines (e.g., 7a, 7b, 7c, 7d and 7e) represent the Shannon capacity for different signal to noise ratios. The thin lines, (e.g., 8a, 8b, 8c, 8d and 8e), which are generated using the equation shown immediately above, show the capacity that may be achieved by a system employing my inventive space-time architecture and employing nulling (rather than the maximum signal to noise ratio feature). It is seen from the FIG., that the "calculated capacities approach the Shannon capacities at high signal to noise ratios. For example, a comparison between capacity lines 8b and 7b indicates that for an average signal to noise ratio of 18 dB and for n=30. The instant invention has a capacity of 135 bps/Hz, whereas the Shannon limit obtains a capacity of 141 bps/Hz. The FIG. thus illustrates the fact that the claimed invention advantageously approaches the Shannon capacities (and does so using one dimensional coding/decoding technology). An architecture employing the maximum signal to noise ratio variation (rather than nulling) achieves better results, this is especially true at low signal to noise ratios.)

The foregoing is merely illustrative of the principles of the invention. Those skilled in the art will be able to devise numerous arrangements, which, although not explicitly shown or described herein, nevertheless embody those principles that are within the spirit and scope of the invention. For example, the inventive architecture is readily applicable to so-called "leaky feeder" applications. Unlike conventional leaky-feeder transmitter sites, the transmitter sites would be MEAs as described above. As another, parallel processing may be used to enhance the preprocessing and decoding of the vectors. A system using three parallel processors could further enhance such processing by a factor of three by segmenting a diagonal layer, e.g., diagonal layer "a" into three sublayers. The three parallel processors would then be responsible for processing respective ones of the sublayers. Such processing would include preprocessing as well as decoding. As another example and as mentioned above, the aforementioned nulling may be replaced by using well-known techniques to optimize the Signal to Noise Ratio (SNR) where "noise" includes not only Additive White Gaussian Noise (AWGN) but also all interferences that have not yet been subtracted out of the received signal vector that is being processed. The term "signal" in SNR refers to the signal transmitted by the desired antenna at the particular stage of preprocessing. It is noted that in the case where the SNR is large, e.g., 17 dB, then nulling is preferred. Whereas when the SNR is small, e.g., 3 dB, then maximizing SNR is preferred. Moreover, it is expected that the above-described architecture preferably employs an efficient 1-D code in the encoding of the bit substreams. An efficient 1-D code could be, for example, a block code which fits well with the layered structure discussed above in which a diagonal layer of rectangles corresponds to a coded block. At first glance a convolutional code may appear to be unacceptable for the layered structure, however, this is not case. In fact, convolutional codes fit well with a parallel processing architecture. Moreover, the combination of parallel processing and convolutional codes may be used to decode adjoining layers simultaneously as long as a so-called decision depth requirement is met. That is, the detection processes of the different parallel processors should be offset in time such that each diagonal layer is decoded only after the interferences needed for the particular decoding have already been detected and subtracted off.

One advantage that is obtained as a result of using convolutional coding is that the periodic change in the variance of AWGN may be effectively dealt with. For example, assume that there are five symbols per sub-block and the transmitter has 6 antennas. Assume that the sequence of transmit antennas used in transmitting the sub-blocks over a number of consecutive time intervals, e.g., 30, is 666666555554444433333222221111111. In most cases, a symbol transmitted from antenna 6 is subjected to the least amount of interference, and, therefore, tends to need the least error protection.

A symbol transmitted from transmitter 5 is typically subjected to a greater amount of interference (one interference) and, therefore, tends to need more protection, and so on. Accordingly, then, the symbol transmitted from transmitter 1 is typically subjected to the largest amount of interference (five interferences) and, therefore, tends to need the most error protection. It is noted that the term "tend" is used because noise, interference level and channel realization are all random variables.

In decoding convolutional codes, the detection of symbols may be expedited by pairing those symbols that experience the least amount of interference ("protector symbols"), e.g., the symbols transmitted by transmitted 6, with the symbols that experience the most amount of interference ("protected symbols"), e.g., the symbols transmitted by transmitter 1. For example, an improvement would be achieved by permuting the above transmitter sequence to 61616161615252525252524343434343. The encoding (decoding) that accomplishes this sequence is a straightforward permutation (inverse permutation) in the encoding (decoding) process.

I claim:
1. A digital wireless receiver comprising
   a plurality of n antennas, each of the said antennas receiving a succession of complex signals over respective periods of time, $\tau$, each of said complex signals being composed of a plurality of distinct randomly superimposed signal components, where n>1, wherein all of said signal components received by all of said receive antennas at a particular point in time collectively form a signal vector,
   a processor that forms said signal components received over said periods of time into respective space and time relationships, in which space is associated with respective transmitter antenna elements, and wherein said processor includes
      means that preprocesses, in turn, the signal vectors disposed within respective groups along a space-time diagonal by nulling out undecoded contributions to the succession of signal vectors received during the same period of time, $\tau$, as the groups of signal vectors being preprocessed and to subtract out decoded contributions to the same succession of signal vectors in which said groups are associated with respective ones of said periods of time and respective ones of said transmitter antenna elements.
2. A digital wireless receiver comprising
   a plurality of n antennas, each of the said antennas receiving a succession of complex signals over respective periods of time, $\tau$, each of said complex signals being composed of a plurality of distinct randomly superimposed signal components, where n>1, wherein all of said signal components received by all of said receive antennas at a particular point in time collectively form a signal vector,
   a processor that forms said signal components received over said periods of time into respective space and time relationships, in which space is associated with respective transmitter antenna elements, and wherein said processor includes
      means that preprocesses, in turn, the signal vectors within respective groups disposed along a space-time diagonal by maximizing the signal-to-noise ratio of the received transmitted signal component being so processed and to subtract out decoded contributions to the same succession of signal vectors, in which said groups are associated with respective ones of said periods of time and respective ones of said transmitter antenna elements.
3. A receiver circuit comprising
   a plurality of antenna elements for receiving respective n-dimensional signal vectors signals transmitted by a transmitter, said transmitter also having n transmitting antenna elements, where n>1,
   a memory,
   a preprocessing circuit, said preprocessing circuit being operative for (a) unloading from memory one of said n-dimensional vectors that was received during a respective interval of time and that is associated with a respective one of said transmitting antenna elements, (b) subtracting from the unloaded n-dimensional vector detected symbols obtained as a result of preprocessing n-dimensional vectors associated with other ones of said transmitting antenna elements and said respective interval of time, (c) nulling out of the unloaded n-dimensional vector symbols associated with n-dimensional vectors that have not yet been processed, and wherein said preprocessing circuit includes
      means for outputting the result of said preprocessing if the preprocessing of a layer of n-dimensional vectors which includes the n-dimensional vector currently being processed has been completed and for unloading from said memory for preprocessing a next n-dimensional vector included in said layer.

4. A receiver circuit comprising
- a plurality of antenna elements for receiving respective signal vectors signals transmitted by a transmitter, said transmitter also having a plurality of transmitting antenna elements,
- a signal preprocessing circuit,
- a decoder circuit, said signal preprocessing circuit being operative for processing each of said signal vectors to subtract from a signal vector currently being processed a decoded result obtained from decoding a previously detected transmitted signal that had been processed by said preprocessing circuit and to null out of the signal vector currently being processed other undetected elements of the transmitted signal, said decoder circuit being operative for then decoding the result obtained from the preprocessing of said signal vector.

5. The receiver circuit of claim 4 wherein each said signal vector is an n dimensional complex signal vector, where n equals the number of said transmitting antenna elements.

6. The receiver circuit of claim 5 wherein said preprocessing circuit includes means that replicates n times each signal vector received during a predetermined interval of time and arranges the replicated result in time and space in accordance with said transmitting elements and presents for preprocessing a diagonal layer of replicated results associated with n-dimensional signal vectors associated with respective ones of the transmitting elements and received during a respective on the said interval of time.

7. The receiver circuit of claim 6 wherein said preprocessing of said diagonal layer starts with an n-dimensional signal vector received during the earliest point in time along said diagonal layer and ends with the preprocessing of an n-dimensional signal vector received during the latest point in time along said diagonal layer.

8. The receiver circuit of claim 7 wherein said preprocessing continues with a next, succeeding diagonal layer following the preprocessing of the n-dimensional signal vector received during the latest point in time.

9. The receiver of claim 4 further comprising a multiplexer circuit for multiplexing signals outputted by said decoder circuit.

10. A receiver circuit comprising
- a plurality of antenna elements for receiving as respective n-dimensional signal vectors signals transmitted by a transmitter, said transmitter also having n transmitting antenna elements, where n>1,
- a signal preprocessing circuit,
- a decoder circuit, said signal preprocessing circuit being operative for processing each of said n-dimensional signal vectors to subtract from a n-dimensional signal vector currently being processed a decoded result obtained from decoding a previously processed signal that had been processed by said preprocessing circuit and maximizing the signal to noise ratio of the received transmitted signal component being processed, said decoder circuit being operative for then decoding the result obtained from the preprocessing of each n-dimensional signal vector by said signal preprocessing circuit.

* * * * *